UNITED STATES PATENT OFFICE.

CURTIS J. PATTERSON, OF KANSAS CITY, MISSOURI, ASSIGNOR TO THE CAMPBELL BAKING COMPANY, OF KANSAS CITY, MISSOURI, A CORPORATION OF DELAWARE.

PROCESS OF BREAD-MAKING.

1,385,842.            Specification of Letters Patent.     Patented July 26, 1921.

No Drawing.      Application filed March 30, 1921. Serial No. 457,086.

*To all whom it may concern:*

Be it known that I, CURTIS J. PATTERSON, a citizen of the United States, residing at Kansas City, in the county of Jackson and State of Missouri, have invented certain new and useful Improvements in Processes of Bread-Making; and I do declare the following to be a full, clear, and exact description of the invention, such as will enable others skilled in the art to which it appertains to make and use the same.

This invention relates to a method of bread making and one of the objects thereof is to provide means whereby the keeping qualities of the bread will be materially enhanced due to the fact that the flour in the dough batch will be capable of taking up an amount of moisture in excess of that which it would ordinarily be capable of taking.

I have found by actual experiment that peroxid in any of its forms used in the manufacture of bread increases the affinity for water of the flour, necessitating additional moisture in the dough batch in order to produce a dough batch of proper consistency, the result being that the finished product, that is, the baked bread, will remain fresh longer than bread made in the ordinary manner.

I am aware that peroxid has been used for bleaching flour but where the peroxid is used in sufficient quantities to cause an appreciable bleach, the gluten is so broken down that the elasticity and cohesion is depreciated so that the baking properties of the flour are not as good as before the treatment. Indeed, the peroxid can be used to such an extent that the elasticity and cohesion of the gluten can be entirely destroyed.

According to my invention the amount of peroxid in every case is so small that no appreciable bleaching will take place. There is no virtue claimed for the material as a bleach, the only effect being to increase the moisture requirement of the dough batch for a given consistency.

The amount of peroxid used with a given amount of flour will vary in proportion to the percentage of available oxygen present in the specific peroxid employed. The following table will be illustrative, based on the percentage of flour by weight.

Hydrogen peroxid, $(H_2O_2)$ -- .0033
Calcium peroxid, $(CaO_2)$ --- .007
Magnesium peroxid, $(MgO_2)$ - .0055
Sodium, $(Na_2O_2)$ --------- .0073
Potassium, $(K_2O_2)$ -------- .0107.

It is to be understood that the weight of the different peroxids employed is in direct proportion to the percentage of the available oxygen present in the compound.

The required moisture to be introduced into the dough batch to make the mass of proper consistency may vary due to a number of reasons, the condition of the flour, the quality, etc., all of which can be readily determined by the operator in the process of combining the ingredients to make the dough batch.

I have found by actual experiment that bread made by my process has higher moisture containing properties than that of bread made by the ordinary method and that, as a result, the keeping properties of the bread are materially enhanced.

The peroxid may be introduced into the dough batch in any convenient manner. It is generally introduced in the form of a powder at the dough stage of the sponge (if a sponge is prepared) but in the straight dough process it may be mixed along with the other dough constituents and the treatment of the dough may proceed in the usual manner. If hydrogen peroxid is employed, it should be combined with the water entering the dough batch. The other forms of peroxid, being solids, are preferably introduced at the dough stage of the sponge as above described.

I have demonstrated by actual practice that there is no change in the fermentation due to the inclusion of peroxid in approximately the proportions specified, the advantage claimed being that the moisture content of the dough may be increased and as a result, the finished loaf will remain moist for a longer period than is possible with bread made according to known methods and that the peroxid causes the gluten to absorb the water without destroying the elasticity of the dough, the resultant product being a well formed loaf having better keeping qualities than the ordinary loaf.

What I claim and desire to secure by Letters-Patent is:

1. The step in the process of making bread which consists in incorporating with the flour and other ingredients of the dough batch, peroxid in such quantities as will increase the moisture capacity of the dough batch above the normal without breaking down the gluten in the flour, such peroxid being non-toxic to permit its use in a food product.

2. The step in the process of making bread which consists in incorporating with the flour and other ingredients of the dough batch, hydrogen peroxid in such quantities as will increase the moisture capacity of the dough batch above the normal without breaking down the gluten of the flour.

In testimony whereof I affix my signature.

CURTIS J. PATTERSON.